US012687635B2

(12) United States Patent
Takata et al.

(10) Patent No.: US 12,687,635 B2
(45) Date of Patent: Jul. 21, 2026

(54) LEO SATELLITE, LEO SATELLITE SYSTEM, AND CONTROL METHOD

(71) Applicant: NEC Corporation, Minato-ku (JP)

(72) Inventors: Koya Takata, Tokyo (JP); Masahiro Kaiden, Tokyo (JP); Kenji Wakafuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 536 days.

(21) Appl. No.: 18/276,774

(22) PCT Filed: Jan. 13, 2022

(86) PCT No.: PCT/JP2022/000857
§ 371 (c)(1),
(2) Date: Aug. 10, 2023

(87) PCT Pub. No.: WO2022/201758
PCT Pub. Date: Sep. 29, 2022

(65) Prior Publication Data
US 2024/0103169 A1 Mar. 28, 2024

(30) Foreign Application Priority Data

Mar. 26, 2021 (JP) ................................ 2021-053786

(51) Int. Cl.
*G01S 17/00* (2020.01)
*G01S 17/42* (2006.01)
(52) U.S. Cl.
CPC .................................... *G01S 17/42* (2013.01)
(58) Field of Classification Search
CPC .......... G01S 17/42; G01S 17/74; G01S 17/08; G01S 17/88; G01C 3/06; H04B 7/185; H04B 10/11; H04B 10/80
See application file for complete search history.

(56) References Cited

U.S. PATENT DOCUMENTS 4,214,807 A * 7/1980 Gfeller ................. H04B 10/118
359/848
4,703,479 A * 10/1987 Ikeda ..................... H04B 7/212
370/518
(Continued)

FOREIGN PATENT DOCUMENTS

JP        2018-528659 A     9/2018
JP        2019-047262 A     3/2019
WO        2013/036328 A1    3/2013

OTHER PUBLICATIONS

International Search Report for PCT Application No. PCT/JP2022/000857, mailed on Apr. 12, 2022.
(Continued)

*Primary Examiner* — Frank F Huang
(74) *Attorney, Agent, or Firm* — Sughrue Mion, PLLC

(57) ABSTRACT an LEO satellite includes a light projecting element that emits emission light to another LEO satellite, an optical telescope, an optical phased array, a light receiving element that receives incident light from the other LEO satellite, a distance measurement unit that measures a distance to the other LEO satellite based on at least one of the emission light and the incident light, and a control unit. The control unit captures the other LEO satellites by scanning emission light using the optical telescope and receives incident light from the other LEO satellites for the other LEO satellites on the same orbital plane, and captures the other LEO satellites by scanning emission light using the optical phased array and receives incident light from the other LEO satellites for the other LEO satellites on different orbital planes.

20 Claims, 12 Drawing Sheets

(56) References Cited

U.S. PATENT DOCUMENTS

| | | | | |
|---|---|---|---|---|
| 4,881,078 A * | 11/1989 | Yamane | H01Q 3/08 | 342/368 |
| 4,901,310 A * | 2/1990 | Ichiyoshi | H04B 7/2045 | 370/307 |
| 4,979,170 A * | 12/1990 | Gilhousen | G02B 6/4249 | 370/347 |
| 5,260,639 A * | 11/1993 | De Young | H10F 10/144 | 244/1 R |
| 5,327,572 A * | 7/1994 | Freeburg | H04B 7/18563 | 455/448 |
| 5,386,953 A * | 2/1995 | Stuart | B64G 1/44 | 244/158.4 |
| 5,410,728 A * | 4/1995 | Bertiger | H04B 7/1856 | 455/13.1 |
| 5,652,750 A * | 7/1997 | Dent | H04B 7/18532 | 455/12.1 |
| 5,999,127 A | 12/1999 | Dezelan | | |
| 6,241,192 B1 * | 6/2001 | Kondo | B64G 1/244 | 244/164 |
| 7,151,929 B1 * | 12/2006 | Jenkin | H04B 7/18582 | 455/430 |
| 9,960,837 B1 * | 5/2018 | Coleman | H04B 7/18521 | |
| 10,587,335 B1 * | 3/2020 | Choi | H04B 7/18513 | |
| 11,274,929 B1 * | 3/2022 | Afrouzi | G06T 7/30 | |
| 11,298,835 B2 * | 4/2022 | Kim | B25J 19/026 | |
| 11,327,483 B2 * | 5/2022 | Al-Mohssen | A47L 11/4011 | |
| 11,327,503 B2 * | 5/2022 | Deyle | G06V 20/58 | |
| 11,331,805 B2 * | 5/2022 | Cappello | A63F 13/90 | |
| 11,579,252 B2 * | 2/2023 | Robertson, Jr. | G01S 7/4813 | |
| 2013/0065514 A1 | 3/2013 | Whelan et al. | | |
| 2017/0225336 A1 * | 8/2017 | Deyle | B25J 11/008 | |
| 2017/0302377 A1 | 10/2017 | Boroson et al. | | |
| 2018/0167586 A1 * | 6/2018 | Rutschman | G06V 20/13 | |
| 2018/0227043 A1 | 8/2018 | Dankberg | | |
| 2019/0266414 A1 * | 8/2019 | Stawiszynski | G06Q 50/26 | |
| 2021/0037393 A1 * | 2/2021 | Choi | H04L 67/10 | |
| 2021/0208949 A1 * | 7/2021 | Bijwe | G06F 9/5005 | |
| 2021/0333406 A1 * | 10/2021 | Lee | G01S 17/42 | |
| 2021/0336692 A1 * | 10/2021 | Choi | H04B 7/18567 | |
| 2023/0092301 A1 * | 3/2023 | Burr | H04B 10/1129 | 398/115 |

OTHER PUBLICATIONS

Korehiro Maeda et al., "Inter-Orbit Communication Technology," The Journal of the Institute of Electronics, Information and Communication Engineers, vol. 77, No. 7, Jul. 25, 1994, pp. 775-786.

* cited by examiner 10-1 10-2

EMISSION LIGHT

REFLECTED LIGHT

CASE OF SAME ORBITAL PLANE
(USING OPTICAL TELESCOPE)

CASE OF DIFFERENT ORBITAL PLANE
(USING OPTICAL PHASED ARRAY)

LEO SATELLITE, LEO SATELLITE SYSTEM, AND CONTROL METHOD

This application is a National Stage Entry of PCT/JP2022/000857 filed on Jan. 13, 2022, which claims priority from Japanese Patent Application 2021-053786 filed on Mar. 26, 2021, the contents of all of which are incorporated herein by reference, in their entirety.

TECHNICAL FIELD

The present disclosure relates to a low earth orbit (LEO) satellite, an LEO satellite system, and a control method.

BACKGROUND ART

In recent years, application technologies related to LEO satellites configuring an LEO satellite constellation have been developed. For example, Patent Literature 1 discloses a technology for measuring a distance between LEO satellites by wirelessly transmitting and receiving a distance measurement signal between the LEO satellites.

CITATION LIST

Patent Literature

Patent Literature 1: International Patent Publication No. 2013/036328

SUMMARY OF INVENTION

Technical Problem

However, the technology disclosed in Patent Literature 1 has a problem that it is necessary to add a distance measuring device to the LEO satellite because a distance measuring signal is wirelessly transmitted and received between the LEO satellites.

Therefore, an object of the present disclosure is to solve the above-described problems and to provide an LEO satellite, an LEO satellite system, and a control method capable of measuring a distance between LEO satellites without adding a distance measuring device to the LEO satellite.

Solution to Problem

A low earth orbit (LEO) satellite according to an aspect is an LEO satellite that configures an LEO satellite constellation, the LEO satellite including:
a light projecting element that emits laser light as emission light to another LEO satellite configuring the LEO satellite constellation;
an optical telescope;
an optical phased array;
a light receiving element that receives laser light from the other LEO satellite as incident light;
a distance measurement unit that measures a distance from the LEO satellite to the other LEO satellite based on at least one of the emission light and the incident light; and
a control unit that controls the light projecting element and the light receiving element, in which
the control unit
causes the light receiving element to receive the incident light from the other LEO satellite by capturing the other LEO satellite by scanning the emission light emitted from the light projecting element using the optical telescope for the other LEO satellite on the same orbital plane as the LEO satellite, and
causes the light receiving element to receive the incident light from the other LEO satellite by capturing the other LEO satellite by scanning the emission light emitted from the light projecting element using the optical phased array for the other LEO satellite on an orbital plane different from the LEO satellite.

A low earth orbit (LEO) satellite system according to an aspect is an LEO satellite including
a plurality of LEO satellites that configures an LEO satellite constellation, in which
each of the plurality of LEO satellites includes:
a light projecting element that emits laser light as emission light to another LEO satellite configuring the LEO satellite constellation;
an optical telescope;
an optical phased array;
a light receiving element that receives laser light from the other LEO satellite as incident light;
a distance measurement unit that measures a distance from the LEO satellite to the other LEO satellite based on at least one of the emission light and the incident light; and
a control unit that controls the light projecting element and the light receiving element, and
the control unit
causes the light receiving element to receive the incident light from the other LEO satellite by capturing the other LEO satellite by scanning the emission light emitted from the light projecting element using the optical telescope for the other LEO satellite on the same orbital plane as the LEO satellite, and
causes the light receiving element to receive the incident light from the other LEO satellite by capturing the other LEO satellite by scanning the emission light emitted from the light projecting element using the optical phased array for the other LEO satellite on an orbital plane different from the LEO satellite.

A control method according to an aspect is a method of controlling a low earth orbit (LEO) satellite that configures an LEO satellite constellation, the method including:
a step of emitting laser light as emission light to another LEO satellite configuring the LEO satellite constellation by a light projecting element;
a step of receiving laser light from the other LEO satellite as incident light by a light receiving element;
a step of measuring a distance from the LEO satellite to the other LEO satellite based on at least one of the emission light and the incident light; and
a control step of controlling the light projecting element and the light receiving element, in which
in the control step,
the light receiving element is caused to receive the incident light from the other LEO satellite by capturing the other LEO satellite by scanning the emission light emitted from the light projecting element using the optical telescope for the other LEO satellite on the same orbital plane as the LEO satellite, and
the light receiving element is caused to receive the incident light from the other LEO satellite by capturing the other LEO satellite by scanning the emission light emitted from the light projecting element using the optical phased array for the other LEO satellite on an orbital plane different from the LEO satellite.

Advantageous Effects of Invention

According to the above aspect, it is possible to provide the LEO satellite, the LEO satellite system, and the control method capable of measuring the distance between the LEO satellites without adding a distance measuring device to the LEO satellite.

EXAMPLE EMBODIMENT

Example embodiments of the present disclosure are described below with reference to the drawings. Note that in the description and drawings described below, omission and simplification are made as appropriate, for clarity of description. Furthermore, in each of the drawings described below, the same elements are denoted by the same reference signs, and a duplicate description is omitted as necessary.

EXAMPLE EMBODIMENTS

Configuration of Example Embodiment

Figure 1:
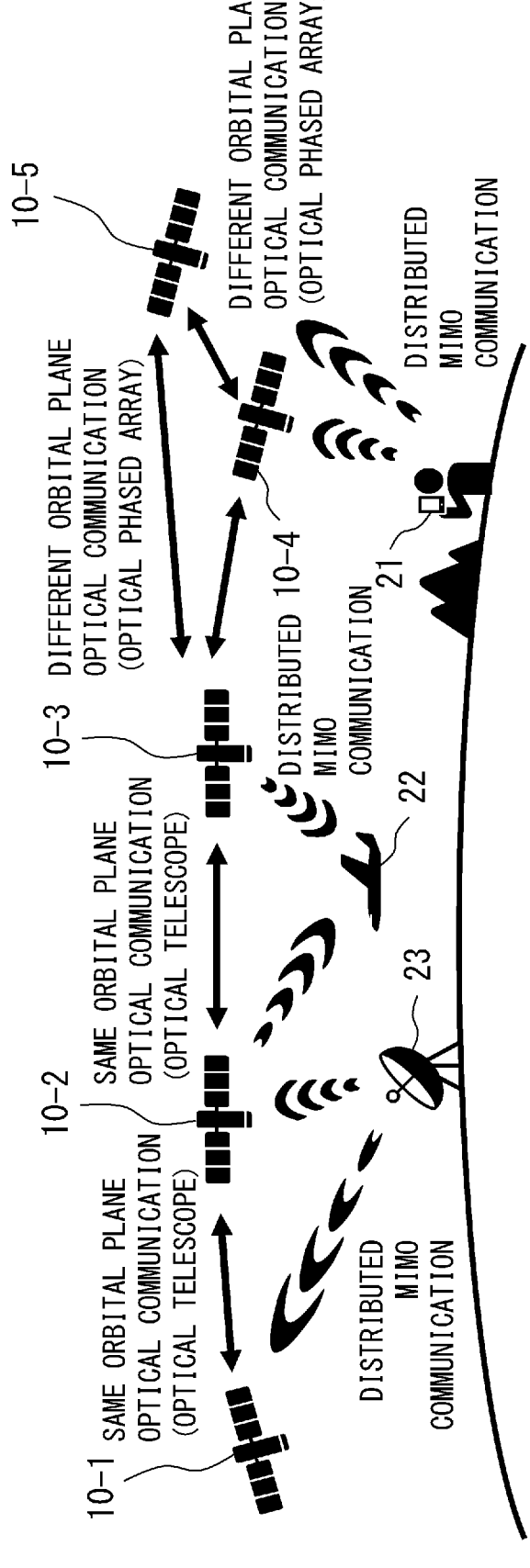
FIG. 1 is a diagram illustrating an overall configuration example of an LEO satellite system according to an example embodiment.

First, an overall configuration example of an LEO satellite system according to the present example embodiment will be described with reference to FIG. 1. As illustrated in FIG. 1, the LEO satellite system according to the present example embodiment includes LEO satellites 10-1 to 10-5 configuring an LEO satellite constellation. Note that, in FIG. 1, it is assumed that the LEO satellites 10-1 to 10-4 move on the same orbital plane, and the LEO satellite 10-5 moves on an orbital plane different from the orbital planes of the LEO satellites 10-1 to 10-4.

Hereinafter, in a case where the LEO satellites 10-1 to 10-5 are referred to without particular distinction, they may be simply referred to as the "LEO satellite 10".

Furthermore, in FIG. 1, five LEO satellites 10-1 to 10-5 are provided, but the number of LEO satellites 10 may be two or more.

In the present example embodiment, as will be described later, distributed multiple input multiple output (MIMO) can be realized by utilizing antennas (not illustrated) provided in the LEO satellites 10-1 to 10-5. Therefore, each of the LEO satellites 10-1 to 10-5 can perform distributed MIMO communication with a terminal 21, an aircraft 22, a parabolic antenna 23, and the like.

Next, a configuration example of the LEO satellite 10 according to the present example embodiment will be described with reference to FIG. 2. Note that FIG. 2 illustrates a configuration example of the LEO satellite 10-1, but the other LEO satellites 10-2 to 10-5 also have the same configuration as the LEO satellite 10-1.

Figure 2:
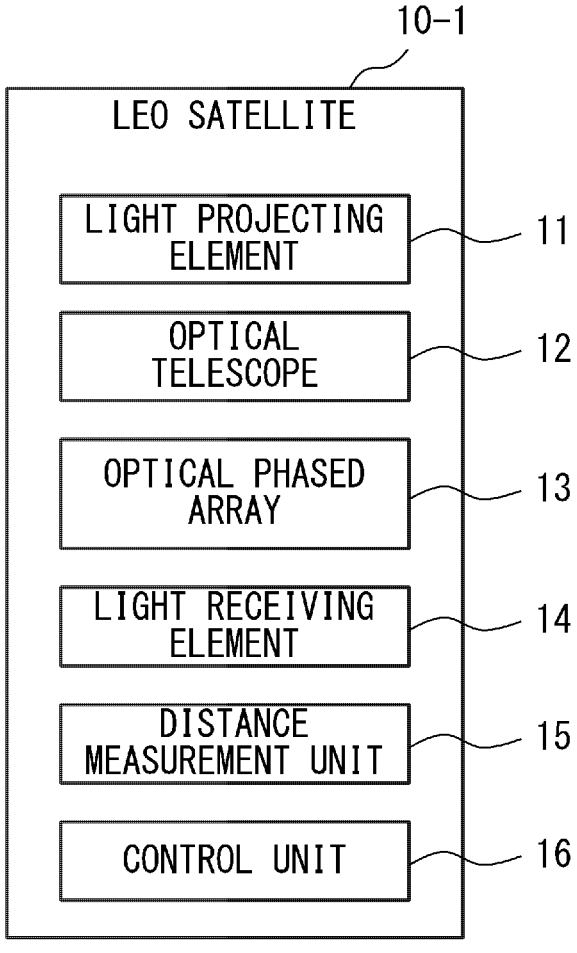
FIG. 2 is a block diagram illustrating a configuration example of an LEO satellite according to the example embodiment.

As illustrated in FIG. 2, the LEO satellite 10-1 according to the present example embodiment includes a light projecting element 11, an optical telescope 12, an optical phased array 13, a light receiving element 14, a distance measurement unit 15, and a control unit 16. Note that, in FIG. 2, only components related to distance measurement in the LEO satellite 10-1 are illustrated, and other components are not illustrated.

The light projecting element 11 emits laser light as emission light to the other LEO satellites 10 configuring the LEO satellite constellation.

The optical telescope 12 is used to capture other LEO satellites 10 on the same orbital plane as LEO satellites 10-1.

The optical phased array 13 is used to capture other LEO satellites 10 on a different orbital plane than from that of the LEO satellites 10-1.

The control unit 16 controls the light projecting element 11 and the light receiving element 14, and captures another LEO satellite 10 using the optical telescope 12 or the optical phased array 13.

Note that details of the optical telescope 12, the optical phased array 13, and the control unit 16 will be described later.

The light receiving element 14 receives laser light from another LEO satellite 10 as incident light. The incident light is, for example, laser light (reflected light) obtained by reflecting emission light emitted from the light projecting element 11 by another LEO satellite 10, laser light emitted from the light projecting element 11 of another LEO satellite 10, or the like.

The distance measurement unit 15 measures a distance from the LEO satellite 10-1 to another LEO satellite 10 based on at least one of the emission light emitted from the light projecting element 11 and the incident light received by the light receiving element 14.

Operation of Example Embodiment

Next, the operation of the LEO satellite system according to the present example embodiment will be described.

First, an example of a distance measurement method in the distance measurement unit 15 will be described. The distance measurement unit 15 may measure the distance using an arbitrary distance measurement method among the distance measurement methods described below. Hereinafter, a case where the distance measurement unit 15 of the LEO satellite 10-1 measures the distance to the LEO satellite 10-2 on the same orbital plane will be described as an example. However, the distance measurement method described below is also applicable to a case where the distance measurement unit 15 of the LEO satellite 10-1 measures the distance to the LEO satellite 10-5 of a different orbital plane.

(1) Reflective Type Distance Measurement Method

First, a reflective type distance measurement method will be described.

Figure 3:
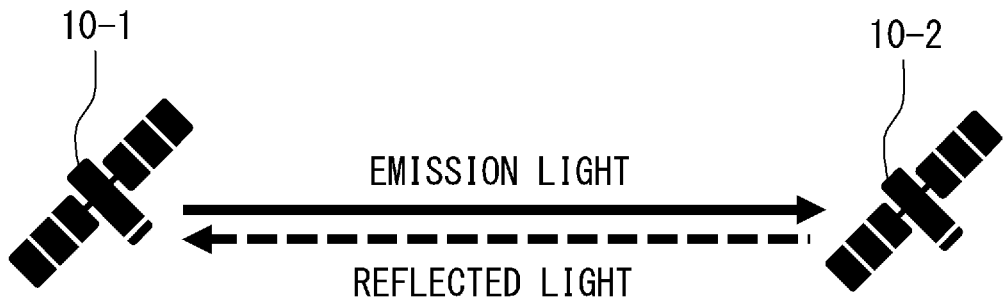
FIG. 3 is a diagram illustrating a principle of a reflective type distance measurement method in a distance measurement unit according to the example embodiment.

In the reflective type distance measurement method, as illustrated in FIG. 3, the LEO satellite 10-1 emits emission light to the LEO satellite 10-2, and receives reflected light of the emission light reflected by the LEO satellite 10-2. Then, the distance measurement unit 15 of the LEO satellite 10-1 measures the distance from the LEO satellite 10-1 to the LEO satellite 10-2 based on at least one of the emission light and the reflected light.

Examples of the reflective type distance measurement method include a pulse propagation method, a phase difference distance method, and a triangular distance measurement method. Each distance measurement method will be described below.

(1-1) Pulse Propagation Method

First, a pulse propagation method will be described with reference to FIG. 4.

Figure 4:
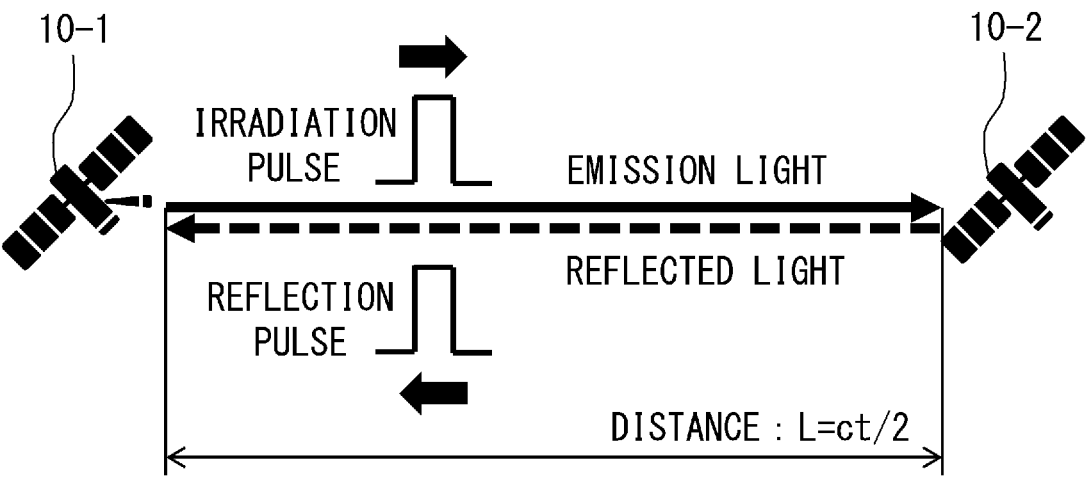
FIG. 4 is a diagram illustrating a principle of a pulse propagation method in the distance measurement unit according to the example embodiment.

As illustrated in FIG. 4, in the pulse propagation method, the emission light is a rectangular wave with a constant pulse width. The distance measurement unit 15 of the LEO satellite 10-1 measures a time t since the pulse is emitted as the emission light and then the pulse is received as the reflected light. Then, the distance measurement unit 15 of the LEO satellite 10-1 calculates a distance L from the LEO satellite 10-1 to the LEO satellite 10-2 by the following mathematical formula using a light speed c.

$$L=ct/2$$

Therefore, in the pulse propagation method, the LEO satellite 10-1 needs a clock for measuring the time t. A highly accurate atomic clock is suitable as the clock of the LEO satellite 10-1.

(1-2) Phase Difference Distance Method

Next, the phase difference distance method will be described with reference to FIG. 5.

Figure 5:
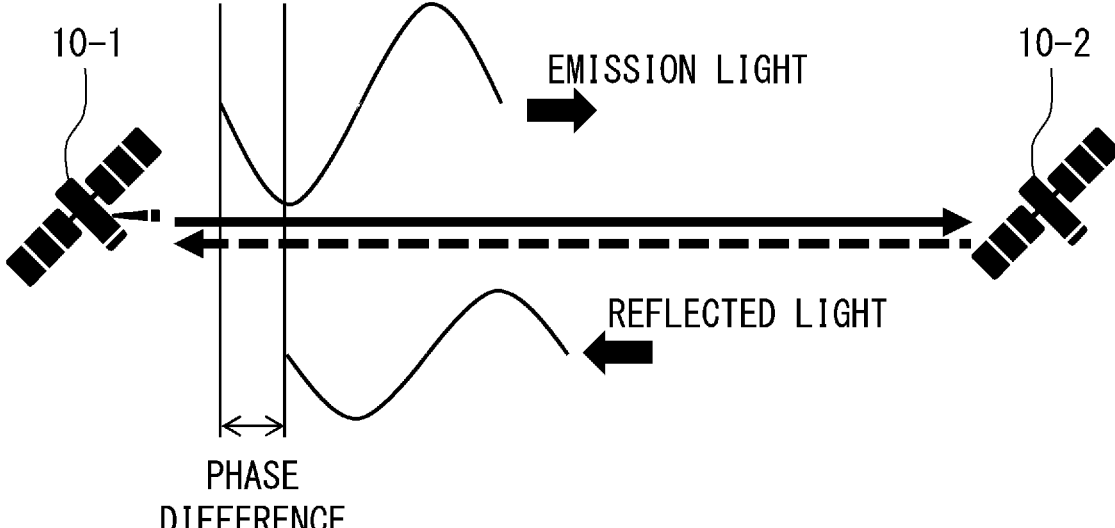
FIG. 5 is a diagram illustrating a principle of a phase difference distance method in the distance measurement unit according to the example embodiment.

As illustrated in FIG. 5, in the phase difference distance method, the emission light is a sine wave. The phase difference between the emission light and the reflected light changes according to the distance L from the LEO satellite 10-1 to the LEO satellite 10-2. Therefore, the distance measurement unit 15 of the LEO satellite 10-1 calculates the distance L based on the phase difference between the emission light and the reflected light.

(1-3) Triangular Distance Measurement Method

Next, a triangular distance measurement method will be described with reference to FIG. 6.

Figure 6:
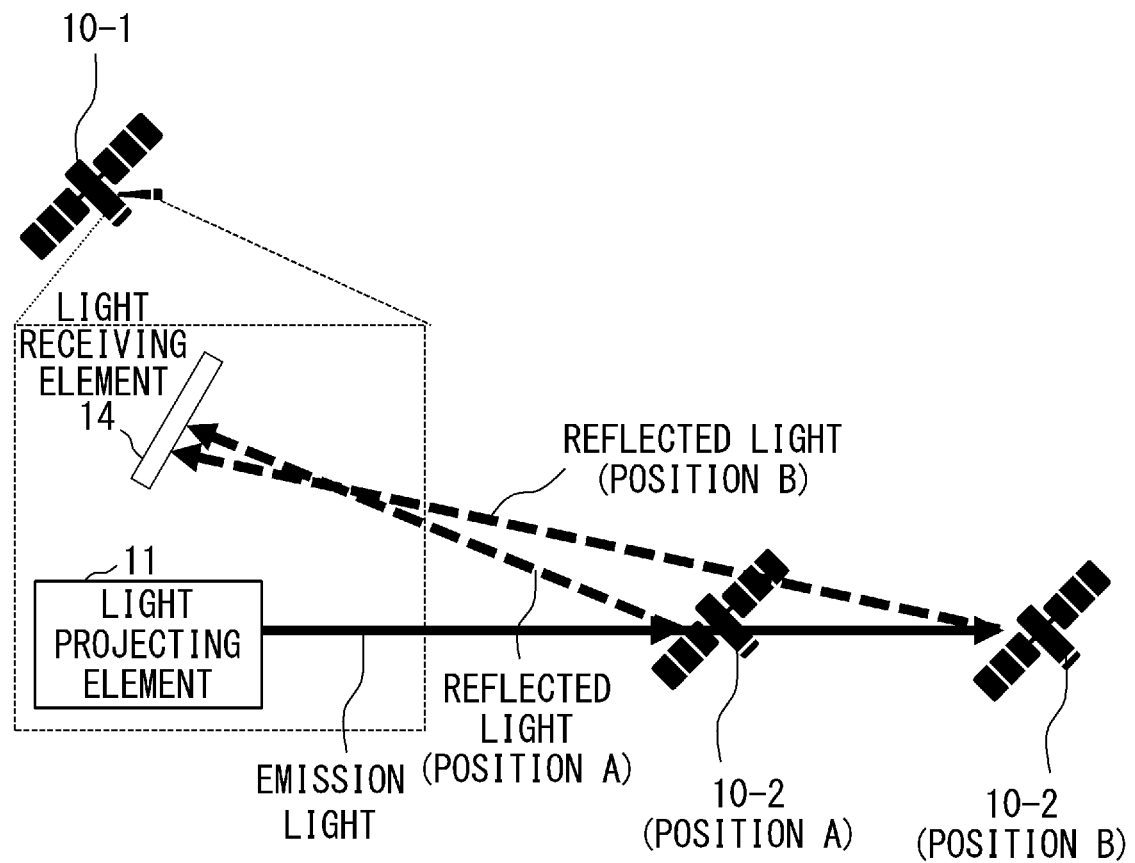
FIG. 6 is a diagram illustrating a principle of a triangular distance measurement method in the distance measurement unit according to the example embodiment.

As illustrated in FIG. 6, the reflected light reflected by the LEO satellite 10-2 is received by the light receiving element 14 of the LEO satellite 10-1. At this time, the position on the light receiving element 14 where the reflected light is received changes according to the distance L from the LEO satellite 10-1 to the LEO satellite 10-2. In the example of FIG. 5, the distance L is different between when the LEO satellite 10-2 is at a position A and when it is at a position B, and as a result, the position on the light receiving element 14 where the reflected light is received also changes. Therefore, the distance measurement unit 15 of the LEO satellite 10-1 calculates the distance L based on the position on the light receiving element 14 at which the reflected light is received.

(2) Bidirectional Transmission/Reception Type Distance Measurement Method

Next, a bidirectional transmission/reception type distance measurement method will be described.

Figure 7:
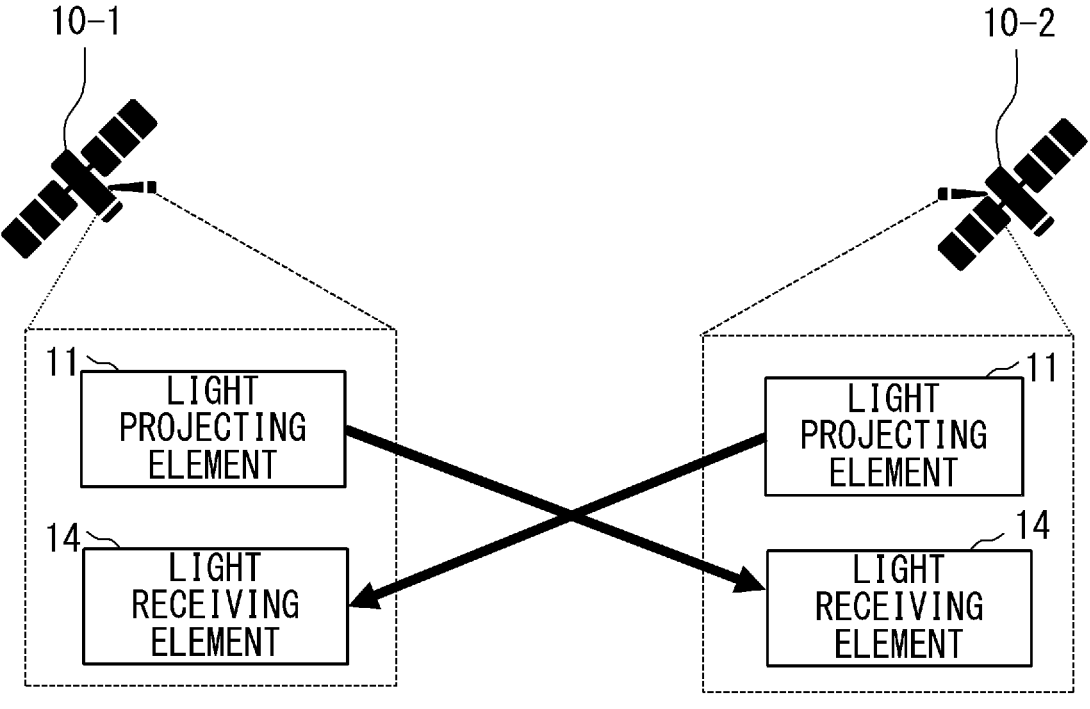
FIG. 7 is a diagram illustrating a principle of a bidirectional transmission/reception type distance measurement method in the distance measurement unit according to the example embodiment.

In the bidirectional transmission/reception type distance measurement method, as illustrated in FIG. 7, the light projecting element 11 of the LEO satellite 10-1 emits emission light, and the light receiving element 14 of the LEO satellite 10-2 receives the emission light. In addition, the light projecting element 11 of the LEO satellite 10-2 also emits the emission light, and the light receiving element 14 of the LEO satellite 10-1 receives the emission light.

At this time, the emission time is included in the emission light emitted by the light projecting element 11 of the LEO satellite 10-2. Then, the distance measurement unit 15 of the LEO satellite 10-1 calculates the distance L from the LEO satellite 10-1 to the LEO satellite 10-2 based on the emission time at which the light projecting element 11 of the LEO satellite 10-2 emits emission light and the reception time at which the light receiving element 14 of the LEO satellite 10-1 receives the emission light.

Similarly, the emission time is also included in the emission light emitted by the light projecting element 11 of the LEO satellite 10-1. Then, the distance measurement unit 15 of the LEO satellite 10-2 calculates the distance L based on the emission time at which the light projecting element 11 of the LEO satellite 10-1 emits the emission light and the light receiving time at which the light receiving element 14 of the LEO satellite 10-2 receives the emission light.

Therefore, in the bidirectional transmission/reception type distance measurement method, the LEO satellites 10-1 and 10-2 need clocks. A highly accurate atomic clock is suitable as the clock of the LEO satellites 10-1 and 10-2.

As described above, the distance measurement unit 15 of the LEO satellite 10-1 measures the distance from the LEO satellite 10-1 to another LEO satellite using any of the above-described distance measurement methods. The same applies to the distance measurement units 15 of the other LEO satellites 10-2 to 10-5.

However, in any of the above-described distance measurement methods, in order for the distance measurement unit 15 to perform distance measurement, it is necessary to capture another LEO satellite 10.

Figure 8:
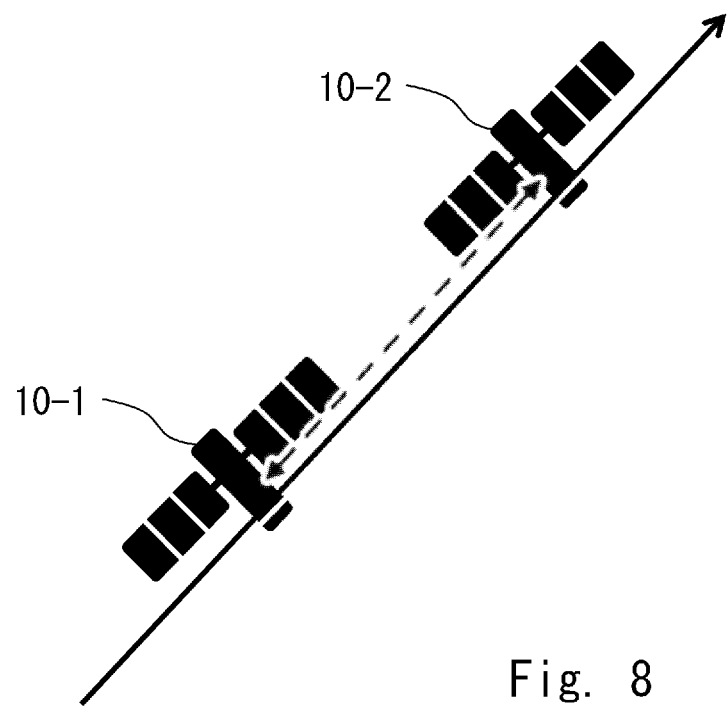
FIG. 8 is a diagram illustrating an operation example when a control unit according to the example embodiment captures another LEO satellite on the same orbital plane.

Here, as illustrated in FIG. 8, for example, in a case where the distance measurement unit 15 of the LEO satellite 10-1 measures the distance to the LEO satellite 10-2 on the same orbital plane, the relative velocity of the LEO satellite 10-2 with respect to the LEO satellite 10-1 decreases. Therefore, the control unit 16 of the LEO satellite 10-1 can capture the LEO satellite 10-2 by scanning the mechanical emission light. Therefore, in this case, the control unit 16 of the LEO satellite 10-1 captures the LEO satellite 10-2 by scanning the emission light emitted from the light projecting element 11 using the optical telescope 12, and causes the light receiving element 14 to receive the incident light from the LEO satellite 10-2.

Figure 9:
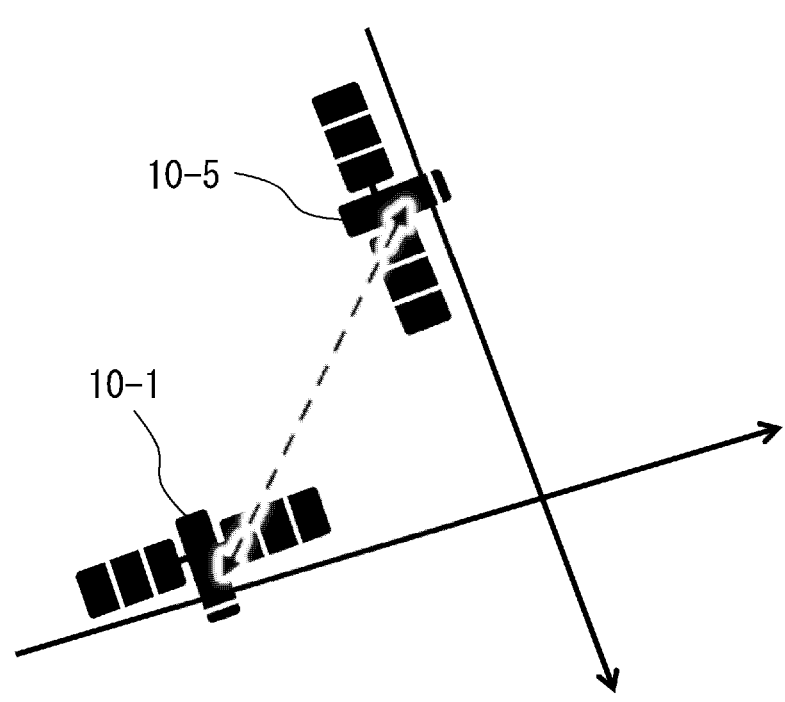
FIG. 9 is a diagram illustrating an operation example when the control unit according to the example embodiment captures another LEO satellite on a different orbital plane.

On the other hand, as illustrated in FIG. 9, for example, in a case where the distance measurement unit 15 of the LEO satellite 10-1 measures the distance to the LEO satellite 10-5 on a different orbital plane, the relative velocity of the LEO satellite 10-5 with respect to the LEO satellite 10-1 increases. Therefore, even if the control unit 16 of the LEO satellite 10-1 uses the optical telescope 12, the optical telescope 12 has a problem in tracking speed, and thus, cannot capture the LEO satellite 10-5. For this reason, in order to capture the LEO satellite 10-5, scanning with electronic emission light is required. Therefore, in this case, the control unit 16 of the LEO satellite 10-1 captures the LEO satellite 10-5 by scanning the emission light using the optical phased array 13, and causes the light receiving element 14 to receive the incident light from the LEO satellite 10-5.

Note that, in a case where the control unit 16 captures another LEO satellite 10 using the optical phased array 13, it is preferable to capture another LEO satellite 10 in the vicinity of the intersection of the orbital plane. This makes it possible to compensate for the low gain of the antenna included in the LEO satellite 10.

In addition, in a case where the control unit 16 captures another LEO satellite 10 using the optical phased array 13, it is preferable to capture another LEO satellite 10 on an orbital plane having different altitudes in an orbit having an altitude of 300 km to 2000 km.

In addition, the optical phased array 13 is preferably realized using an electro-optic polymer.

In addition, the optical phased array 13 is preferably realized using an optical waveguide based on a silicon microfabrication technology.

Next, with reference to FIG. 10, an example of an operation flow in a case where the distance to another LEO satellite 10 is measured in the LEO satellite 10 according to the present example embodiment will be described. Here, a case where the LEO satellite 10-1 measures a distance to another LEO satellite 10 will be described as an example.

Figure 10:
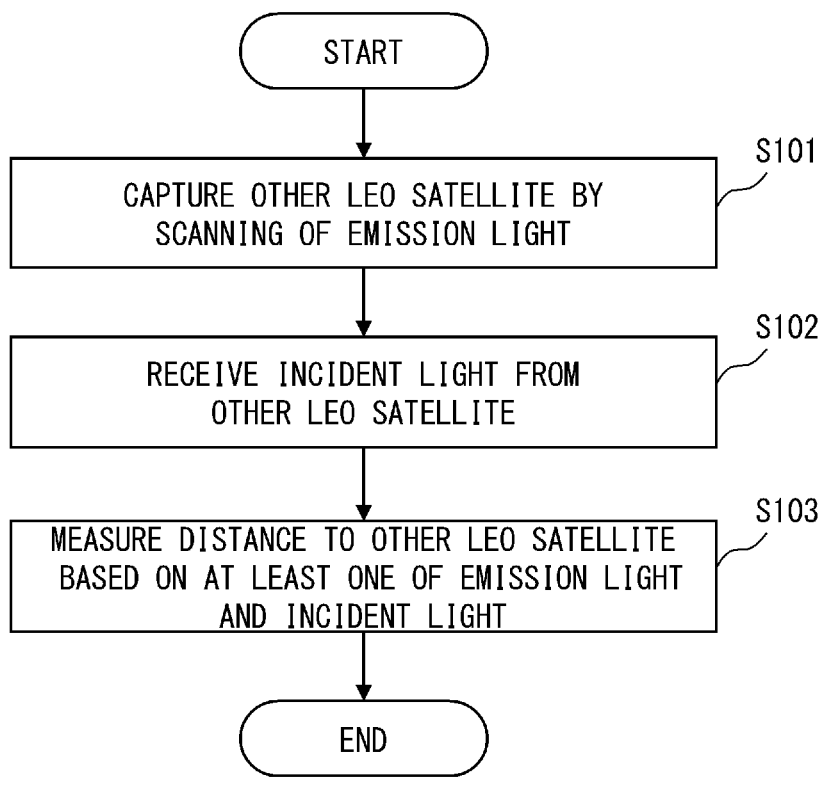
FIG. 10 is a flowchart illustrating an example of an operation flow in a case where a distance to another LEO satellite is measured in the LEO satellite according to the example embodiment.

As illustrated in FIG. 10, the control unit 16 of the LEO satellite 10-1 captures the other LEO satellite 10 by scanning the emission light emitted from the light projecting element 11 (step S101), and causes the light receiving element 14 to receive the captured incident light from the other LEO satellite 10 (Step S102). At this time, in a case where the other LEO satellite 10 is the LEO satellite 10 on the same orbital plane, the control unit 16 performs capture using the optical telescope 12, and in a case where the other LEO satellite 10 is the LEO satellite 10 on a different orbital plane, the control unit performs capture using the optical phased array 13.

Thereafter, the distance measurement unit 15 of the LEO satellite 10-1 measures the distance from the LEO satellite 10-1 to another LEO satellite 10 based on at least one of the emission light and the incident light (step S103). Note that, as the distance measurement method in the distance measurement unit 15, any distance measurement method may be used from among the reflection type distance measurement method and the bidirectional transmission/reception type distance measurement method described above.

Effects of Example Embodiment

As described above, according to the present example embodiment, the control unit 16 captures the other LEO satellites 10 by scanning the emission light emitted from the light projecting element 11, and causes the light receiving element 14 to receive the incident light from the other LEO satellites 10. At this time, in a case where the other LEO satellite 10 is the LEO satellite 10 on the same orbital plane, the control unit 16 performs capture using the optical telescope 12, and in a case where the other LEO satellite 10 is the LEO satellite on a different orbital plane, the control unit performs capture using the optical phased array 13. Then, the distance measurement unit 15 measures a distance to another LEO satellite 10 based on at least one of the emission light and the incident light.

Therefore, not only in a case where the other LEO satellites 10 are the LEO satellites 10 on the same orbital plane, but also in a case where the other LEO satellites 10 are the LEO satellites 10 on different orbital planes, the distance to the other LEO satellites can be measured. Thus, the distance between the LEO satellites 10 can be measured without adding a distance measuring device to the LEO satellites 10.

Furthermore, in order to implement distributed MIMO by utilizing the antennas included in the plurality of LEO satellites 10 configuring the LEO satellite constellation, for example, in order to combine signals received by different antennas, it is necessary to know the distance between these antennas. In this regard, according to the present example embodiment, since the distance between the LEO satellites 10 can be measured, the distance between the antennas provided in the different LEO satellites 10 can be measured as the distance between the LEO satellites 10. Thus, distributed MIMO can be implemented by utilizing antennas included in the plurality of LEO satellites 10.

Hardware Configuration of LEO Satellite According to Example Embodiment

Figure 11:
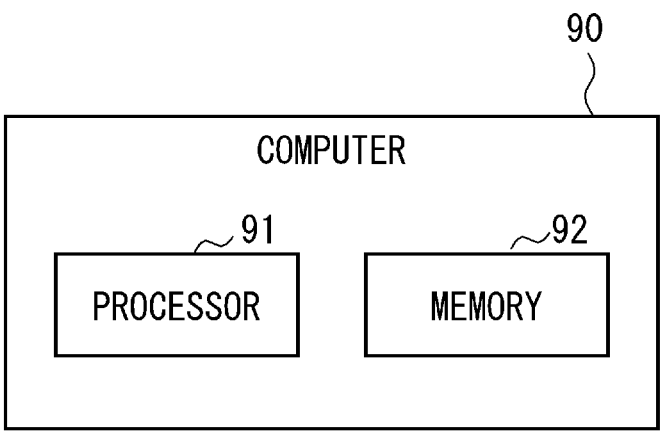
FIG. 11 is a diagram illustrating a hardware configuration example of a computer that implements processing of a part or all of the LEO satellites according to the example embodiment.

Next, a hardware configuration example of a computer 90 that implements processing of a part or all of the LEO satellites 10 according to the above-described example embodiment will be described with reference to FIG. 11. The computer 90 illustrated in FIG. 11 includes a processor 91 and a memory 92.

The processor 91 may be, for example a microprocessor, a micro processing unit (MPU), or a central processing unit (CPU). The processor 91 may include a plurality of processors.

The memory 92 is constituted by a combination of a volatile memory and a nonvolatile memory. The memory 92 may include a storage located away from the processor 91. In this case, the processor 91 may access the memory 92 through an input/output (I/O) interface (not illustrated).

In addition, some components (for example, the distance measurement unit 15, the control unit 16, and the like) in the LEO satellite 10 according to the above-described example embodiments may be implemented by the processor 91 reading and executing a program stored in the memory 92.

In addition, the program described above may be stored by using various types of non-transitory computer readable media to be supplied to a computer. The non-transitory computer-readable media include various types of tangible storage media. Examples of the non-transitory computer readable medium include a magnetic recording medium (for example, a flexible disk, a magnetic tape, or a hard disk drive), a magneto-optical recording medium (for example, a magneto-optical disk), a compact disc-ROM (CD-ROM), a CD-recordable (CD-R), a CD-rewritable (CD-R/W), and a semiconductor memory (for example, a mask ROM, a programmable ROM (PROM), an erasable PROM (EPROM), a flash ROM, or a RAM. Furthermore, the programs may be supplied to the computer by various types of transitory computer readable media. Examples of the transitory computer-readable media include electrical signals, optical signals, and electromagnetic waves. Transitory computer readable media can provide the program to a computer via a wired communication line such as electric wires and optical fibers or a radio communication line.

Although the present disclosure has been described with reference to the example embodiments, the present disclosure is not limited to the example embodiments described above. Various modifications that can be understood by those skilled in the art can be made to the configuration and details of the present disclosure within the scope of the present disclosure.

For example, the LEO satellite 10 generally includes an encoder. Therefore, the LEO satellite 10 may detect the angle of the emission light using an encoder and measure the altitude of the LEO satellite 10 based on the angle of the emission light. Furthermore, the LEO satellite 10 may utilize the measured altitude for correction of the orbit or the like.

Figure 12:
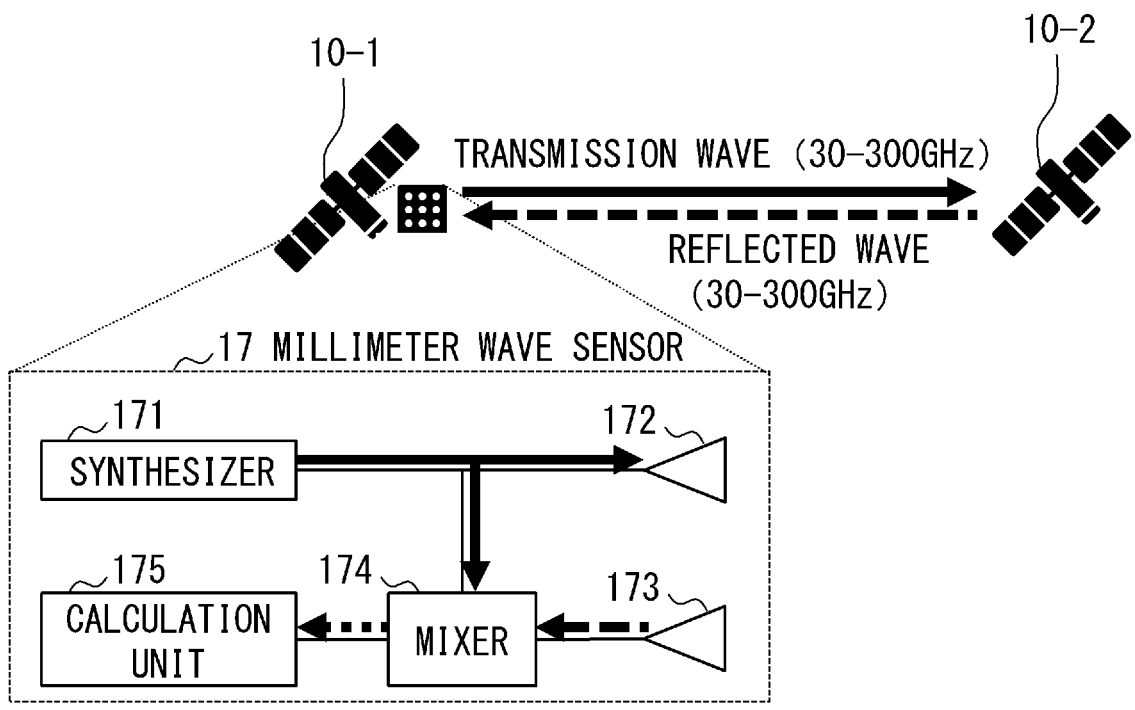
FIG. 12 is a diagram illustrating a configuration example of a millimeter wave sensor in an LEO satellite according to another example embodiment.

Furthermore, the LEO satellite 10 may include a millimeter wave sensor in a band of 30 GHz to 300 GHz as the distance measurement unit 15. Here, a configuration example of the millimeter wave sensor 17 in the LEO satellite 10 according to another example embodiment will be described with reference to FIG. 12. Note that FIG. 12 illustrates a configuration example of the millimeter wave sensor 17 in the LEO satellite 10-1, but the millimeter wave sensors 17 in the other LEO satellites 10-2 to 10-5 have a similar configuration. The millimeter wave sensor 17 illustrated in FIG. 12 is a millimeter wave sensor in a band of 30 GHz to 300 GHz including a synthesizer 171, a TX antenna 172, an RX antenna 173, a mixer 174, and a calculation unit 175. The calculation unit 175 is realized by, for example, a processor such as a CPU. In a case of measuring the distance from LEO satellite 10-1 to LEO satellite 10-2, the millimeter wave sensor 17 operates as follows. That is, the TX antenna 172 transmits a transmission wave to the LEO satellite 10-2, and the RX antenna 173 receives a reflected wave of the transmission wave reflected by the LEO satellite 10-2. The mixer 174 mixes the transmission wave and the reception wave to generate an intermediate frequency (IF) signal. The calculation unit 175 measures the distance from the LEO satellite 10-1 to the LEO satellite 10-2 based on the IF signal. Note that the millimeter wave sensor 17 is preferably realized by using a 300 GHz band antenna. As a result, since the millimeter wave sensor 17 can be reduced in size and weight, the price of the LEO satellite 10 can be reduced.

Furthermore, part or the entirety of the example embodiments described above can also be described as described in the following supplementary notes, but is not limited to the following.

(Supplementary Note 1)

A low earth orbit (LEO) satellite that configures an LEO satellite constellation, the LEO satellite comprising:

a light projecting element configured to emit laser light as emission light to another LEO satellite configuring the LEO satellite constellation;

an optical telescope;

an optical phased array;

a light receiving element configured to receive laser light from the other LEO satellite as incident light;

a distance measurement unit configured to measure a distance from the LEO satellite to the other LEO satellite based on at least one of the emission light and the incident light; and a control unit configured to control the light projecting element and the light receiving element, wherein the control unit is configured to cause the light receiving element to receive the incident light from the other LEO satellite by capturing the other LEO satellite by scanning the emission light emitted from the light projecting element using the optical telescope for the other LEO satellite on the same orbital plane as the LEO satellite, and cause the light receiving element to receive the incident light from the other LEO satellite by capturing the other LEO satellite by scanning the emission light emitted from the light projecting element using the optical phased array for the other LEO satellite on an orbital plane different from the LEO satellite.

(Supplementary Note 2)

The LEO satellite according to Supplementary Note 1, further comprising: an atomic clock, wherein the incident light is laser light that is the emission light reflected by the other LEO satellite, and the distance measurement unit is configured to measure a distance from the LEO satellite to the other LEO satellite based on a time from emission of the emission light to reception of the incident light by a pulse propagation method.

(Supplementary Note 3)

The LEO satellite according to Supplementary Note 1, wherein the incident light is laser light that is the emission light reflected by the other LEO satellite, and the distance measurement unit is configured to measure a distance from the LEO satellite to the other LEO satellite based on a phase difference between the emission light and the incident light by a phase difference distance method.

(Supplementary Note 4)

The LEO satellite according to Supplementary Note 1, wherein the incident light is laser light that is the emission light reflected by the other LEO satellite, and the distance measurement unit is configured to measure a distance from the LEO satellite to the other LEO satellite based on a position on the light receiving element at which the incident light is received by a triangular distance measurement method.

(Supplementary Note 5)

The LEO satellite according to Supplementary Note 1, further comprising an atomic clock, wherein the incident light is laser light emitted from the other LEO satellite and including emission time information, and the distance measurement unit is configured to measure a distance from the LEO satellite to the other LEO satellite based on a time from when the incident light is emitted from the other LEO satellite to when the incident light is received.

(Supplementary Note 6)

The LEO satellite according to any one of Supplementary Notes 1 to 5, wherein in a case of capturing the other LEO satellite using the optical phased array, the control unit is configured to capture the other LEO satellite on an orbital plane at an altitude different from that of the LEO satellite in an orbit at an altitude of 300 km to 2000 km.

(Supplementary Note 7)

The LEO satellite according to any one of Supplementary Notes 1 to 5, wherein in a case of capturing the other LEO satellite using the optical phased array, the control unit is configured to capture the other LEO satellite near an intersection of an orbital plane.

(Supplementary Note 8)

The LEO satellite according to any one of Supplementary Notes 1 to 7, wherein the optical phased array is realized by using an electro-optic polymer.

(Supplementary Note 9)

The LEO satellite according to any one of Supplementary Notes 1 to 7, wherein the optical phased array is realized by using an optical waveguide based on a silicon microfabrication technology.

(Supplementary Note 10)

The LEO satellite according to any one of Supplementary Notes 1 to 9, further comprising an encoder configured to detect an angle of the emission light, wherein an altitude of the LEO satellite is measured based on the angle of the emission light.

(Supplementary Note 11)

A low earth orbit (LEO) satellite system comprising a plurality of LEO satellites that configures an LEO satellite constellation, wherein each of the plurality of the LEO satellites includes:

a light projecting element configured to emit laser light as emission light to another LEO satellite configuring the LEO satellite constellation;

an optical telescope;

an optical phased array;

a light receiving element configured to receive laser light from the other LEO satellite as incident light;

a distance measurement unit configured to measure a distance from the LEO satellite to the other LEO satellite based on at least one of the emission light and the incident light; and a control unit configured to control the light projecting element and the light receiving element, and the control unit is configured to cause the light receiving element to receive the incident light from the other LEO satellite by capturing the other LEO satellite by scanning the emission light emitted from the light projecting element using the optical telescope for the other LEO satellite on the same orbital plane as the LEO satellite, and cause the light receiving element to receive the incident light from the other LEO satellite by capturing the other LEO satellite by scanning the emission light emitted from the light projecting element using the optical phased array for the other LEO satellite on an orbital plane different from the LEO satellite.

(Supplementary Note 12)

The LEO satellite system according to Supplementary Note 11, further comprising an atomic clock, wherein the incident light is laser light that is the emission light reflected by the other LEO satellite, and the distance measurement unit is configured to measure a distance from the LEO satellite to the other LEO satellite based on a time from emission of the emission light to reception of the incident light by a pulse propagation method.

(Supplementary Note 13)

The LEO satellite system according to Supplementary Note 11, wherein the incident light is laser light that is the emission light reflected by the other LEO satellite, and the distance measurement unit is configured to measure a distance from the LEO satellite to the other LEO satellite based on a phase difference between the emission light and the incident light by a phase difference distance method.

(Supplementary Note 14)

The LEO satellite system according to Supplementary Note 11, wherein the incident light is laser light that is the emission light reflected by the other LEO satellite, and the distance measurement unit is configured to measure a distance from the LEO satellite to the other LEO satellite based on a position on the light receiving element at which the incident light is received by a triangular distance measurement method.

(Supplementary Note 15)

The LEO satellite system according to Supplementary Note 11, further comprising an atomic clock, wherein the incident light is laser light emitted from the other LEO satellite and including emission time information, and the distance measurement unit is configured to measure a distance from the LEO satellite to the other LEO satellite based on a time from when the incident light is emitted from the other LEO satellite to when the incident light is received.

(Supplementary Note 16)

The LEO satellite system according to any one of Supplementary Notes 11 to 15, wherein in a case of capturing the other LEO satellite using the optical phased array, the control unit is configured to capture the other LEO satellite on an orbital plane at an altitude different from that of the LEO satellite in an orbit at an altitude of 300 km to 2000 km.

(Supplementary Note 17)

The LEO satellite system according to any one of Supplementary Notes 11 to 15, wherein in a case of capturing the other LEO satellite using the optical phased array, the control unit is configured to capture the other LEO satellite near an intersection of an orbital plane.

(Supplementary Note 18)

The LEO satellite system according to any one of Supplementary Notes 11 to 17, wherein the optical phased array is realized by using an electro-optic polymer.

(Supplementary Note 19)

The LEO satellite system according to any one of Supplementary Notes 11 to 17, wherein the optical phased array is realized by using an optical waveguide based on a silicon microfabrication technology.

(Supplementary Note 20)

The LEO satellite system according to any one of Supplementary Notes 11 to 19, further comprising an encoder configured to detect an angle of the emission light, wherein an altitude of the LEO satellite is measured based on the angle of the emission light.

(Supplementary Note 21)

A method of controlling a low earth orbit (LEO) satellite that configures an LEO satellite constellation, the method comprising:

a step of emitting laser light as emission light to another LEO satellite configuring the LEO satellite constellation by a light projecting element;

a step of receiving laser light from the other LEO satellite as incident light by a light receiving element;

a step of measuring a distance from the LEO satellite to the other LEO satellite based on at least one of the emission light and the incident light; and a control step of controlling the light projecting element and the light receiving element, wherein in the control step, the light receiving element is caused to receive the incident light from the other LEO satellite by capturing the other LEO satellite by scanning the emission light emitted from the light projecting element using the optical telescope for the other LEO satellite on the same orbital plane as the LEO satellite, and the light receiving element is caused to receive the incident light from the other LEO satellite by capturing the other LEO satellite by scanning the emission light emitted from the light projecting element using the optical phased array for the other LEO satellite on an orbital plane different from the LEO satellite.

This application claims priority based on Japanese Patent Application No. 2021-053786 filed on Mar. 26, 2021, the entire disclosure of which is incorporated herein.

REFERENCE SIGNS LIST

10-1 to 10-5 LEO SATELLITE
11 LIGHT PROJECTING ELEMENT
12 OPTICAL TELESCOPE
13 OPTICAL PHASED ARRAY
14 LIGHT RECEIVING ELEMENT
15 DISTANCE MEASUREMENT UNIT
16 CONTROL UNIT
17 MILLIMETER WAVE SENSOR
171 SYNTHESIZER
172 TX ANTENNA
173 RX ANTENNA
174 MIXER
175 CALCULATION UNIT
21 TERMINAL
22 AIRCRAFT
23 PARABOLIC ANTENNA
90 COMPUTER
91 PROCESSOR
92 MEMORY

What is claimed is:

1. A low earth orbit (LEO) satellite that configures an LEO satellite constellation, the LEO satellite comprising:
a light projecting element configured to emit laser light as emission light to another LEO satellite configuring the LEO satellite constellation;
an optical telescope;
an optical phased array;
a light receiving element configured to receive laser light from the other LEO satellite as incident light;
at least one memory storing instructions; and
at least one processor configured to execute the instructions to
measure a distance from the LEO satellite to the other LEO satellite based on at least one of the emission light and the incident light, and
the light projecting element and the light receiving element, wherein
the at least one processor is further configured to execute the instructions to
cause the light receiving element to receive the incident light from the other LEO satellite by capturing the other LEO satellite by scanning the emission light emitted from the light projecting element using the optical telescope for the other LEO satellite on the same orbital plane as the LEO satellite, and
cause the light receiving element to receive the incident light from the other LEO satellite by capturing the other LEO satellite by scanning the emission light emitted from the light projecting element using the optical phased array for the other LEO satellite on an orbital plane different from the LEO satellite.

2. The LEO satellite according to claim 1, further comprising: an atomic clock, wherein
the incident light is laser light that is the emission light reflected by the other LEO satellite, and
the at least one processor is further configured to execute the instructions to measure a distance from the LEO satellite to the other LEO satellite based on a time from emission of the emission light to reception of the incident light by a pulse propagation method.

3. The LEO satellite according to claim 1, wherein
the incident light is laser light that is the emission light reflected by the other LEO satellite, and
the at least one processor is further configured to execute the instructions to measure a distance from the LEO satellite to the other LEO satellite based on a phase difference between the emission light and the incident light by a phase difference distance method.

4. The LEO satellite according to claim 1, wherein
the incident light is laser light that is the emission light reflected by the other LEO satellite, and
the at least one processor is further configured to execute the instructions to measure a distance from the LEO satellite to the other LEO satellite based on a position on the light receiving element at which the incident light is received by a triangular distance measurement method.

5. The LEO satellite according to claim 1, further comprising an atomic clock, wherein
the incident light is laser light emitted from the other LEO satellite and including emission time information, and
the at least one processor is further configured to execute the instructions to measure a distance from the LEO satellite to the other LEO satellite based on a time from when the incident light is emitted from the other LEO satellite to when the incident light is received.

6. The LEO satellite according to claim 1, wherein in a case of capturing the other LEO satellite using the optical phased array, the at least one processor is further configured to execute the instructions to capture the other LEO satellite on an orbital plane at an altitude different from that of the LEO satellite in an orbit at an altitude of 300 km to 2000 km.

7. The LEO satellite according to claim 1, wherein in a case of capturing the other LEO satellite using the optical phased array, the at least one processor is further configured to execute the instructions to capture the other LEO satellite near an intersection of an orbital plane.

8. The LEO satellite according to claim 1, wherein the optical phased array is realized by using an electro-optic polymer.

9. The LEO satellite according to claim 1, wherein the optical phased array is realized by using an optical waveguide based on a silicon microfabrication technology.

10. The LEO satellite according to claim 1, further comprising an encoder configured to detect an angle of the emission light,
wherein an altitude of the LEO satellite is measured based on the angle of the emission light.

11. A low earth orbit (LEO) satellite system comprising
a plurality of LEO satellites that configures an LEO satellite constellation, wherein
each of the plurality of the LEO satellites includes:
a light projecting element configured to emit laser light as emission light to another LEO satellite configuring the LEO satellite constellation;
an optical telescope;
an optical phased array;
a light receiving element configured to receive laser light from the other LEO satellite as incident light;
at least one memory storing instructions; and
at least one processor configured to execute the instructions to
measure a distance from the LEO satellite to the other LEO satellite based on at least one of the emission light and the incident light, and control the light projecting element and the light receiving element, wherein the at least one processor is further configured to execute the instructions to cause the light receiving element to receive the incident light from the other LEO satellite by capturing the other LEO satellite by scanning the emission light emitted from the light projecting element using the optical telescope for the other LEO satellite on the same orbital plane as the LEO satellite, and cause the light receiving element to receive the incident light from the other LEO satellite by capturing the other LEO satellite by scanning the emission light emitted from the light projecting element using the optical phased array for the other LEO satellite on an orbital plane different from the LEO satellite.

12. The LEO satellite system according to claim 11, further comprising an atomic clock, wherein the incident light is laser light that is the emission light reflected by the other LEO satellite, and the at least one processor is further configured to execute the instructions to measure a distance from the LEO satellite to the other LEO satellite based on a time from emission of the emission light to reception of the incident light by a pulse propagation method.

13. The LEO satellite system according to claim 11, wherein the incident light is laser light that is the emission light reflected by the other LEO satellite, and the at least one processor is further configured to execute the instructions to measure a distance from the LEO satellite to the other LEO satellite based on a phase difference between the emission light and the incident light by a phase difference distance method.

14. The LEO satellite system according to claim 11, wherein the incident light is laser light that is the emission light reflected by the other LEO satellite, and the at least one processor is further configured to execute the instructions to measure a distance from the LEO satellite to the other LEO satellite based on a position on the light receiving element at which the incident light is received by a triangular distance measurement method.

15. The LEO satellite system according to claim 11, further comprising an atomic clock, wherein the incident light is laser light emitted from the other LEO satellite and including emission time information, and the at least one processor is further configured to execute the instructions to measure a distance from the LEO satellite to the other LEO satellite based on a time from when the incident light is emitted from the other LEO satellite to when the incident light is received.

16. The LEO satellite system according to claim 11, wherein in a case of capturing the other LEO satellite using the optical phased array, the at least one processor is further configured to execute the instructions to capture the other LEO satellite on an orbital plane at an altitude different from that of the LEO satellite in an orbit at an altitude of 300 km to 2000 km.

17. The LEO satellite system according to claim 11, wherein in a case of capturing the other LEO satellite using the optical phased array, the at least one processor is further configured to execute the instructions to capture the other LEO satellite near an intersection of an orbital plane.

18. The LEO satellite system according to claim 11, wherein the optical phased array is realized by using an electro-optic polymer.

19. The LEO satellite system according to claim 11, wherein the optical phased array is realized by using an optical waveguide based on a silicon microfabrication technology.

20. A method of controlling a low earth orbit (LEO) satellite that configures an LEO satellite constellation, the method comprising:

a step of emitting laser light as emission light to another LEO satellite configuring the LEO satellite constellation by a light projecting element;

a step of receiving laser light from the other LEO satellite as incident light by a light receiving element;

a step of measuring a distance from the LEO satellite to the other LEO satellite based on at least one of the emission light and the incident light; and a control step of controlling the light projecting element and the light receiving element, wherein in the control step, the light receiving element is caused to receive the incident light from the other LEO satellite by capturing the other LEO satellite by scanning the emission light emitted from the light projecting element using the optical telescope for the other LEO satellite on the same orbital plane as the LEO satellite, and the light receiving element is caused to receive the incident light from the other LEO satellite by capturing the other LEO satellite by scanning the emission light emitted from the light projecting element using the optical phased array for the other LEO satellite on an orbital plane different from the LEO satellite.

* * * * *